United States Patent
Nelson et al.

(10) Patent No.: US 9,943,992 B2
(45) Date of Patent: Apr. 17, 2018

(54) CONTROLLING TEMPERATURE IN EXOTHERMIC REACTIONS WITH A PHASE CHANGE MATERIAL

(75) Inventors: Karl M. Nelson, Issaquah, WA (US); Geoffrey Allen Butler, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 1232 days.

(21) Appl. No.: 13/480,179

(22) Filed: May 24, 2012

(65) Prior Publication Data

US 2012/0227247 A1    Sep. 13, 2012

Related U.S. Application Data

(62) Division of application No. 12/330,850, filed on Dec. 9, 2008, now abandoned.

(51) Int. Cl.
  *B29C 35/02* (2006.01)
  *F28D 15/00* (2006.01)
  *B29C 33/02* (2006.01)

(52) U.S. Cl.
  CPC .......... *B29C 35/0288* (2013.01); *F28D 15/00* (2013.01); *Y10T 29/4998* (2015.01)

(58) Field of Classification Search
  USPC ............... 264/234, 236, 327; 425/445, 446; 165/104.33, 104.21, 10
  See application file for complete search history.

(56) References Cited

U.S. PATENT DOCUMENTS

| | | | | |
|---|---|---|---|---|
| 3,229,759 A | * | 1/1966 | Grover | F28D 15/04 165/104.26 |
| 3,453,950 A | * | 7/1969 | Pfeiffer | B29C 33/04 100/199 |
| 3,651,861 A | | 3/1972 | Deuring | |
| 4,218,420 A | * | 8/1980 | Jacob | B29C 33/04 249/79 |
| 5,306,558 A | * | 4/1994 | Takahashi | B32B 25/20 428/323 |
| 5,442,156 A | * | 8/1995 | Westerman | B29C 66/4332 156/285 |
| 5,645,670 A | | 7/1997 | Reinfelder et al. | |
| 6,031,212 A | * | 2/2000 | Westerman | B29C 66/4332 156/285 |
| 6,037,032 A | | 3/2000 | Klett et al. | |
| 6,087,406 A | * | 7/2000 | Worm | C08J 11/18 521/41.5 |
| 6,270,603 B1 | * | 8/2001 | Westerman | B29C 35/02 156/323 |
| 6,319,599 B1 | | 11/2001 | Buckley | |

(Continued)

OTHER PUBLICATIONS

USPTO examiner's answer dated Aug. 3, 2010 regarding application 2/330,850, 17 Pages.

(Continued)

*Primary Examiner* — Atul P. Khare
(74) *Attorney, Agent, or Firm* — Yee & Associates, P.C.

(57) ABSTRACT

An apparatus may comprise a tool capable of holding a part during curing of the part, and a passive temperature control system. The passive temperature control system may have a phase change material selected as having a phase change temperature that may be capable of controlling heat generated by the part during curing of the part held by the tool.

10 Claims, 7 Drawing Sheets

(56) References Cited

U.S. PATENT DOCUMENTS

| | | |
|---|---|---|
| 7,073,536 B2 | 7/2006 | Blackmore et al. |
| 7,261,541 B2 | 8/2007 | Fong |
| 8,117,815 B2 | 2/2012 | Ke |
| 2002/0195733 A1* | 12/2002 | Cortum ................ C06B 21/005 264/3.1 |
| 2003/0124278 A1 | 7/2003 | Clark et al. |
| 2007/0177330 A1* | 8/2007 | Ackerman ............. B29C 73/10 361/220 |
| 2008/0113175 A1 | 5/2008 | Ke |

OTHER PUBLICATIONS

Appeal brief dated Jun. 23, 2010 regarding application 2/330,850, 24 Pages.

USPTO decision on appeal dated Mar. 30, 2012 regarding application 2/330,850, 7 Pages.

USPTO final office action dated Feb. 26, 2010 regarding application 2/330,850, 12 Pages.

USPTO non-final office action dated Nov. 2, 2009 regarding application 2/330,850, 17 Pages.

Response to office action dated Nov. 30, 2009 regarding application 2/330,850, 15 Pages.

\* cited by examiner

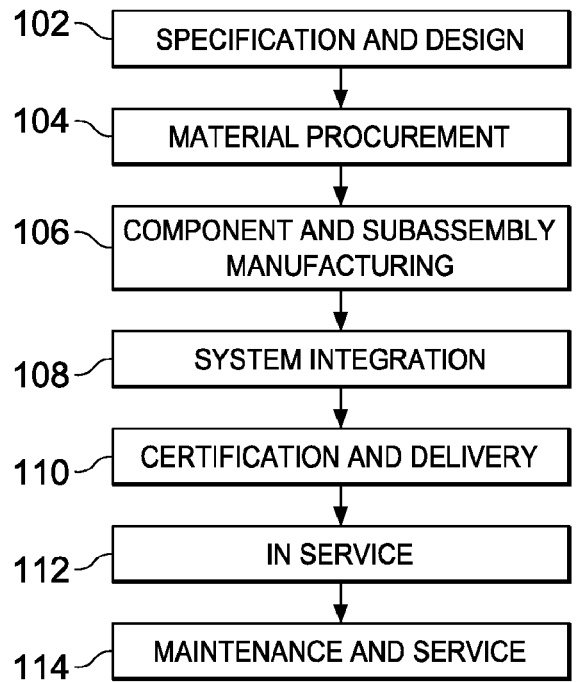
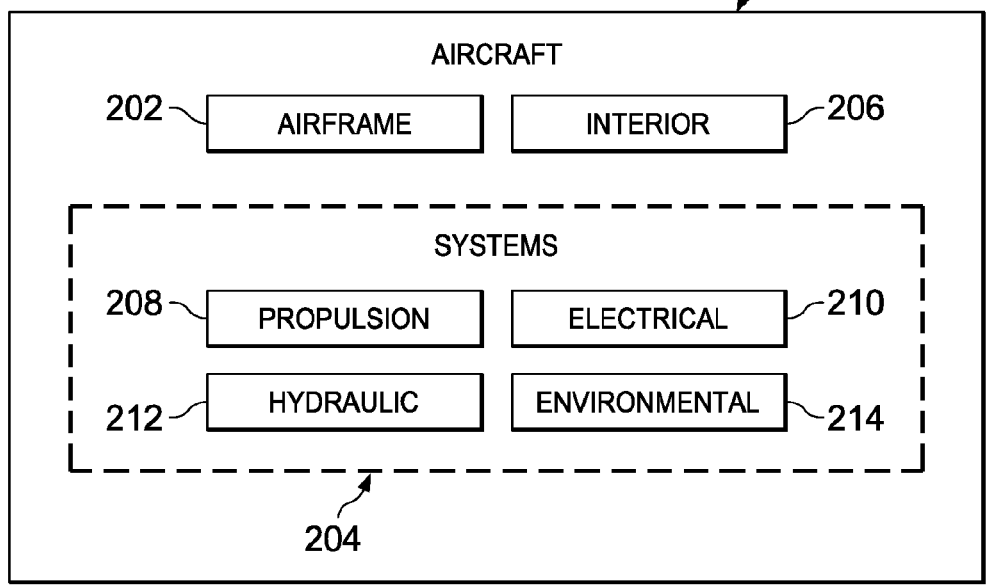

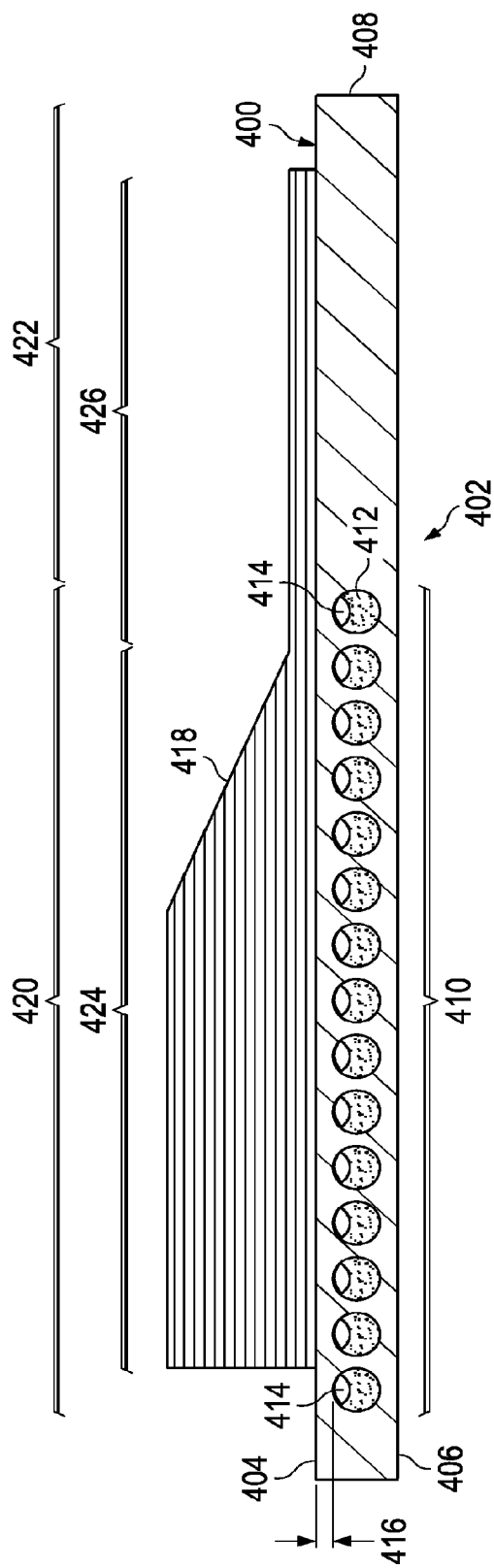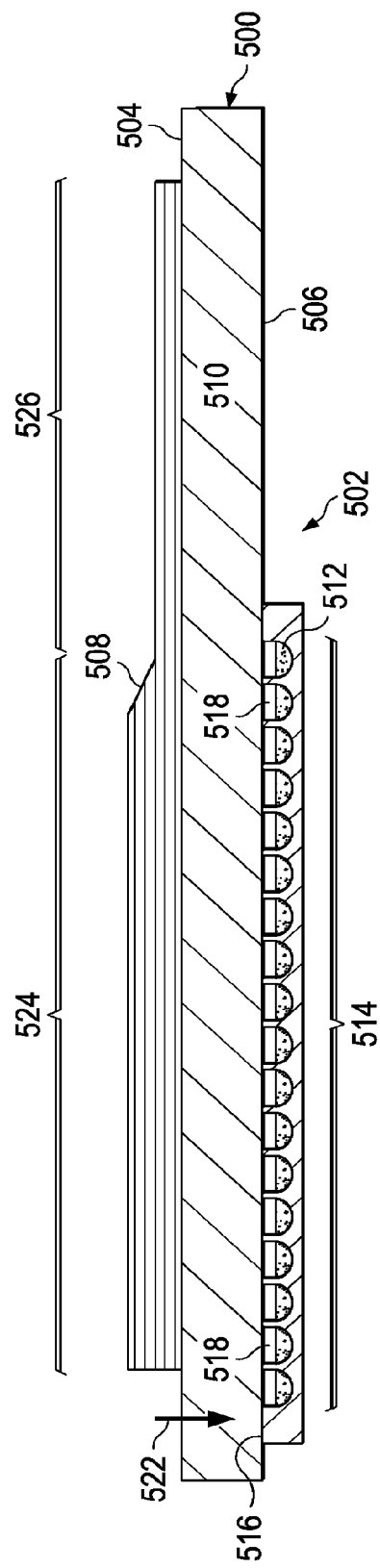
FIG. 4
FIG. 5

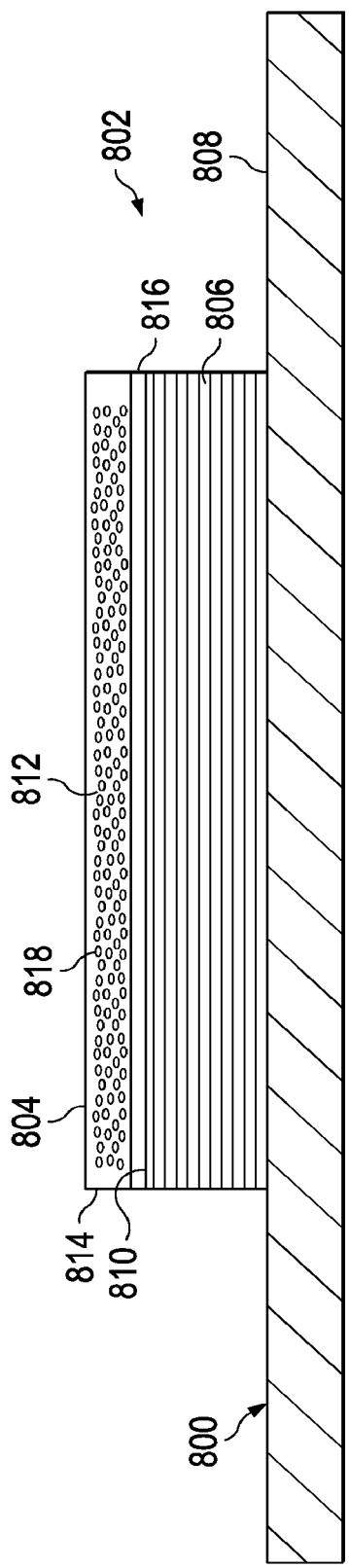
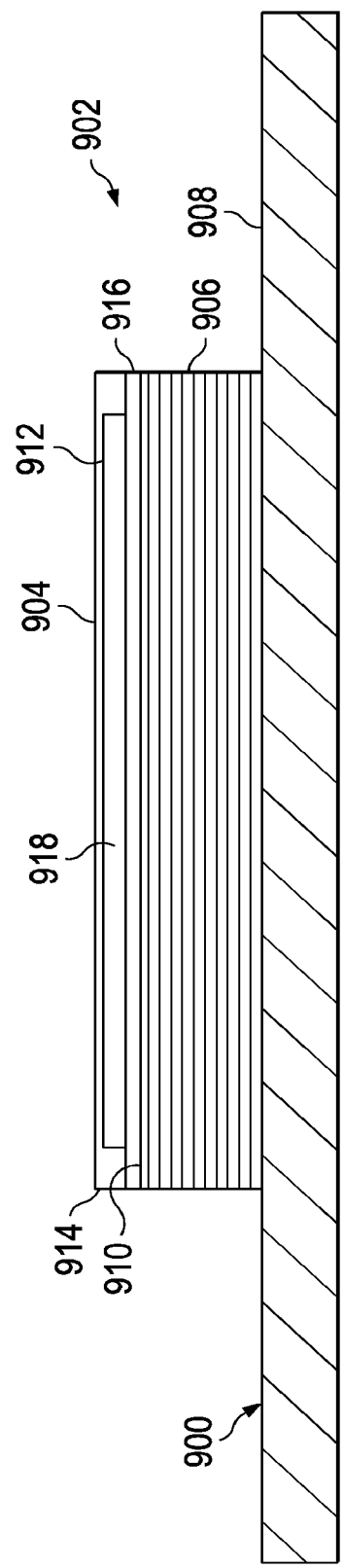
FIG. 8
FIG. 9

CONTROLLING TEMPERATURE IN EXOTHERMIC REACTIONS WITH A PHASE CHANGE MATERIAL

BACKGROUND INFORMATION

This application is a divisional application of U.S. application Ser. No. 12/330,850, filed Dec. 9, 2008.

1. Field:

The present disclosure relates generally to manufacturing and, in particular, to a method and apparatus for manufacturing parts. Still more particularly, the present disclosure relates to a method and apparatus for manufacturing parts in which exothermic reactions may be present.

2. Background:

Aircraft are being designed and manufactured with greater and greater percentages of composite materials. Some aircraft may have more than fifty percent of their primary structure made from composite materials. Composite materials may be used in aircraft to decrease the weight of the aircraft. This decreased weight may improve performance features, such as payload capacities and fuel efficiencies. Further, composite materials may provide longer service life for various components in an aircraft.

Composite materials are strong, light-weight materials, created by combining two or more dissimilar components. For example, without limitation, a composite may include fibers and resins. The resin may be in the form of a substrate or matrix. The fiber may form a reinforcement for the substrate. For example, without limitation, the fibers may take the form of a woven cloth or a uni-directionally oriented ply of fibers. The fibers and resins may be combined and cured to form the composite material.

Further, by using composite materials, portions of an aircraft may be created in larger pieces or sections. For example, without limitation, a fuselage in an aircraft may be created in cylindrical sections that may be put together to form the fuselage of the aircraft. Other examples include, for example, without limitation, wing sections joined to form a wing or stabilizer sections joined to form a stabilizer.

In manufacturing composite parts from composite materials, the composite materials may be cured to form the composite parts. In curing composite materials, processes may be present that involve exothermic reactions.

Under certain conditions, these reactions may become unstable and/or uncontrolled when heat from the reaction is generated faster than the heat can be dissipated to the surroundings. In these types of situations, the temperature of the process rises in a manner that may be undesirable.

For example, without limitation, if the curing process should be performed at around 350 or 355 degrees, some exothermic reactions during the curing process may cause the temperature to exceed an allowable tolerance. The tolerance may be plus or minus 10 degrees Fahrenheit. It is undesirable for the temperature to exceed the upper limit for a curing process. If the temperature during the curing process exceeds the upper limit or tolerance, the particular composite part may be rejected.

This type of exothermic reaction is currently controlled in a number of different ways. For example, without limitation, the heating rate may be slowed to slow the reaction and allow greater time for the heat to dissipate. This type of process, however, may extend the cure cycle by many hours. As a result, equipment used to cure composite parts may be unavailable for long periods of time, therefore reducing the throughput and/or increasing the cost to manufacture composite parts.

Another solution may include inserting a dwell segment into the cure cycle at an intermediate temperature to allow the exothermic reaction to occur at a lower temperature, such that the effect is not undesirable to the part. One drawback of this type of process is that inserting a dwell segment is often not allowed under the procedures and specifications for manufacturing composite parts. Heat sinks also may be used with a tool to control heat flow or absorb excess heat. Heat sinks, however, typically are capable of absorbing excess heat but are seldom used because the heat sinks also slow heating rates needed for the curing process.

The part may be cured multiple times in which the thickness of the part may be increased in stages, such that the temperature tolerance is not exceeded. Curing a part multiple times, however, may require a bond line of adhesive within the structure. This bond line may have undesirable properties.

Thus, it would be advantageous to have a method and apparatus that addresses one or more of the issues discussed above.

SUMMARY

In one advantageous embodiment, an apparatus may comprise a tool capable of holding a part during curing of the part and a passive temperature control system. The passive temperature control system may have a phase change material selected as having a phase change temperature that may be capable of controlling heat generated by the part during curing of the part held by the tool.

In another advantageous embodiment, an apparatus may be present for curing aircraft parts. The apparatus may comprise a tool capable of holding an aircraft part during curing of the aircraft part, and a passive temperature control system. The passive temperature control system may have a phase change material selected as having a phase change temperature that may be capable of controlling heat generated by the aircraft part during curing of the aircraft part. The passive temperature control system may comprise a plurality of cavities formed in the tool and the phase change material may be located within the plurality of cavities. The plurality of cavities may be located a distance from a surface of the tool on which the part may be placed to allow the phase change material to absorb heat from the aircraft part. The plurality of cavities may be formed in a side of the tool substantially parallel to the surface of the tool. An air gap may be present in each cavity in the plurality of cavities. The passive temperature control system may comprise a plate having a plurality of grooves, and the phase change material may be located in the plurality of grooves. The plate may be capable of being attached to the tool to allow the phase change material to absorb the heat from the aircraft part. The passive temperature control system may comprise a caul plate that may comprise a hard layer and a support layer and the phase change material may be embedded within the caul plate. The phase change material may be capable of absorbing the heat when the caul plate may be located on the aircraft part during curing of the aircraft part. The phase change material may be in a form of a plurality of beads, rods, or a plate embedded within the caul plate. The caul plate may be comprised of the hard layer and the plurality of beads embedded in a support layer. The support layer may comprise a material selected from one of an elastomeric material, a composite material, a plastic, or a metallic material. The passive temperature control system may comprise the plurality of cavities formed in the tool, the caul plate, and the phase change material may be located within the plurality of cavities and the caul plate. The plurality of cavities may be located a distance from the surface of the tool on which the aircraft part may be placed to allow the phase change material to absorb the heat from the aircraft part. The phase change material in the caul plate may be located a distance from the aircraft part to allow the phase change material to absorb the heat when the caul plate may be located on the aircraft part during curing of the aircraft part. An exothermic reaction may occur in curing one of an adhesive, a potting compound, or a filler between a first component of the aircraft part and a second component of the aircraft part or in curing the composite material for the part. The phase change temperature may be for a solid to liquid phase change and may be from around 200 degrees Fahrenheit to around 375 degrees Fahrenheit. The phase change material may be selected from one of a metal, a metal alloy, a solder metal, and a eutectic metal.

In yet another advantageous embodiment, a method may be present for curing a part. A part may be placed on a tool for curing the part. The part may be cured using a passive temperature control system while the part is on the tool. The passive temperature control system may have a phase change material selected as having a phase change temperature capable of controlling heat generated by the part during curing of the part.

In a further advantageous embodiment, a method may be present for curing an aircraft part. A part may be placed on a tool for curing the part. The part may be cured using a passive temperature control system while the part is on the tool. The passive temperature control system may have a phase change material selected as having a phase change temperature capable of controlling heat generated by the part during curing of the part. The passive temperature control system may comprise a plurality of cavities formed in the tool and the phase change material may be located within the plurality of cavities. The plurality of cavities may be located a distance from a surface of the tool on which the part may be placed to allow the phase change material to absorb heat from the aircraft part. The passive temperature control system may comprise a plate having a plurality of grooves and the phase change material may be located in the plurality of grooves. The plate may be capable of being attached to the tool to allow the phase change material to absorb the heat from the aircraft part. The passive temperature control system may comprise a caul plate and the phase change material embedded within the caul plate. The phase change material may be capable of absorbing the heat when the caul plate may be located on the part during curing of the part. The passive temperature control system may comprise the plurality of cavities formed in the tool, the caul plate, and the phase change material may be located within the plurality of cavities and the caul plate. The plurality of cavities may be located a distance from the surface of the tool on which the aircraft part may be placed to allow the phase change material to absorb the heat from the aircraft part. The phase change material in the caul plate may be located a distance from the aircraft part to allow the phase change material to absorb the heat when the caul plate may be located on the aircraft part during curing of the aircraft part.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a diagram illustrating an aircraft manufacturing and service method in accordance with an advantageous embodiment;

FIG. 2 is a diagram of an aircraft in which an advantageous embodiment may be implemented;

FIG. 4 is a diagram illustrating a tool and a passive temperature control system in accordance with an advantageous embodiment;

FIG. 5 is a diagram illustrating a tool and a passive temperature control system in accordance with an advantageous embodiment;

FIG. 8 is a diagram illustrating a tool and a passive temperature control system in accordance with an advantageous embodiment;

FIG. 9 is a diagram illustrating a tool and a passive temperature control system in accordance with an advantageous embodiment;

DETAILED DESCRIPTION

Figure 3:
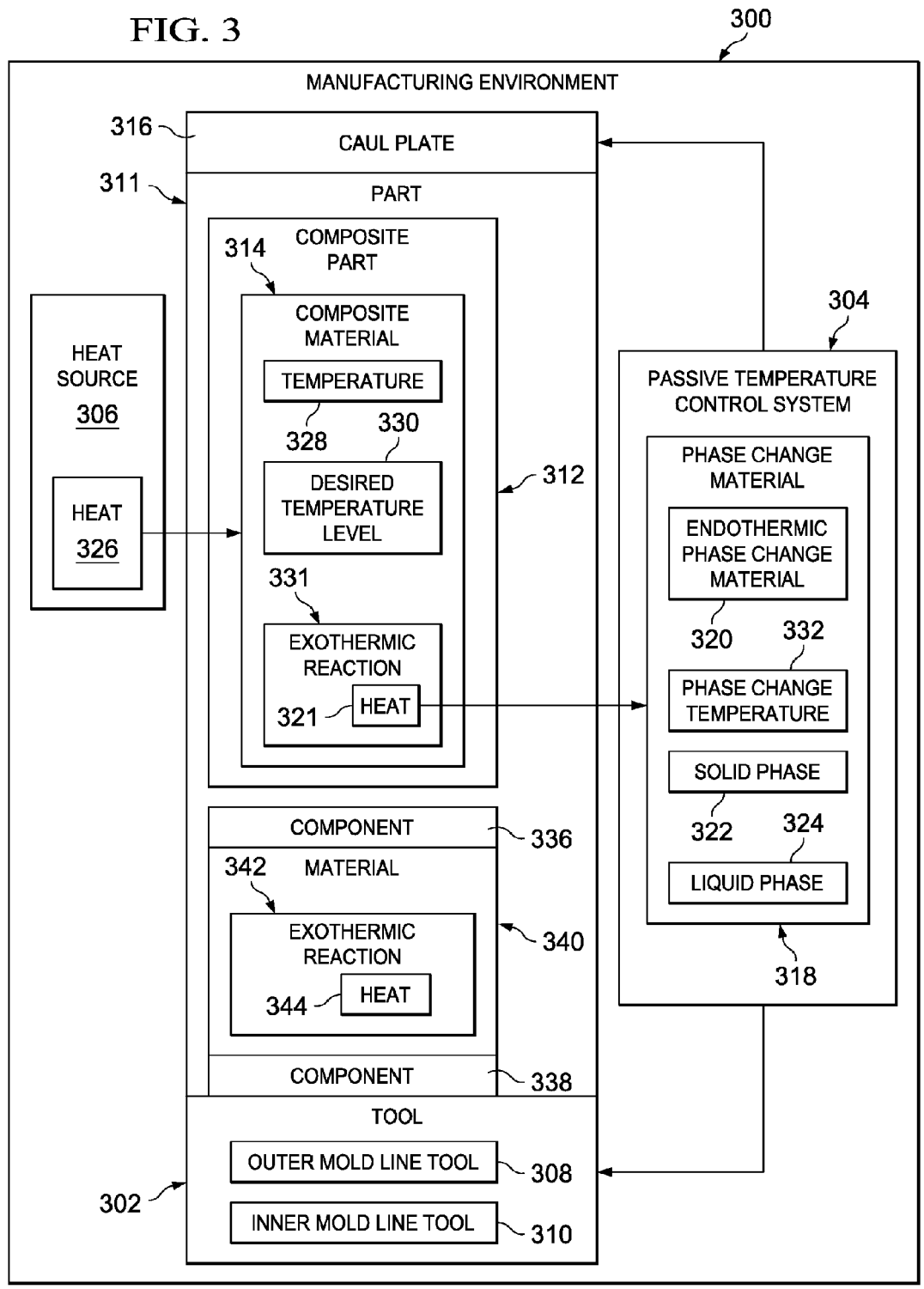
FIG. 3 is a diagram of a manufacturing environment in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, without limitation, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, without limitation, the advantageous embodiments may be used to manufacture composite parts during component and subassembly manufacturing 106 in FIG. 1 and/or maintenance and service 114 in FIG. 1. More specifically, the different advantageous embodiments may be used to produce parts using tools having phase change materials that may be capable of controlling exothermic reactions in a manner that prevents temperatures from exceeding desired temperature levels.

The different advantageous embodiments recognize and take into account that it would be desirable to control the temperature of exothermic reactions during the manufacturing of composite parts. These exothermic reactions may occur during curing of adhesives and/or composite materials in manufacturing a composite part. The different advantageous embodiments recognize and take into account that the current processes for controlling temperatures during curing of a part may be less than desirable when the part is, without limitation, a complex part with a wide variation of thickness, when the part contains various types of core materials, or when different types of tooling are involved.

The different advantageous embodiments may provide a method and apparatus for curing a composite part. A passive temperature control system may be integrated with the tool for curing the composite part. The passive temperature control system may have a phase change material selected as having a phase change temperature that may be capable of helping to control heat generated by the part during curing of a composite part. In these examples, the desired temperature used for curing the composite part may be chosen to be effective for controlling temperature excursions due to exothermic reactions associated with the curing of a composite part.

In other words, a phase change temperature that is around the desired temperature level for curing a composite part may be a temperature that is less than the temperature for curing the composite part. Heat may be controlled by the phase change material absorbing the heat generated by the part during curing of the part. The phase change material may change phase at the phase change material temperature and thereby absorbs heat. The absorption of heat may prevent the exothermic reaction from increasing the temperature above the desired temperature level.

With reference now to FIG. 3, a diagram of a manufacturing environment is depicted in accordance with an advantageous embodiment. In this example, manufacturing environment 300 may have tool 302, passive temperature control system 304, and heat source 306. Tool 302 may take various forms. For example, without limitation, tool 302 may be outer mold line tool 308 or inner mold line tool 310. As another non-limiting example, tool 302 may be a mandrel. In these examples, part 311 may be held by tool 302 for processing. In these examples, part 311 may be held by tool 302 when part 311 is placed on and/or laid up on tool 302. Part 311 may take the form of composite part 312, in some advantageous embodiments.

Composite part 312 may be manufactured on tool 302 by laying up composite material 314 on tool 302. For example, without limitation, composite material 314 may be layers of composite materials laid up to form composite part 312 in the form of a laminate or panel. The layers of composite materials may include, for example, without limitation, plies of uncured or cured pre-impregnated resin and fibers, dry fabric or fibers impregnated with resin, core pieces, and/or pre-cured structures. The uncured or cured pre-impregnated resin and fibers may be referred to as prepreg. The core pieces may be, for example, without limitation, honeycomb foam, and/or some other suitable material. The pre-cured structures may be, for example, without limitation, stringers.

Caul plate 316 may be placed on composite material 314 on tool 302 for curing of composite material 314 to form composite part 312. Caul plate 316 may be used to provide a smooth and/or aesthetically pleasing surface for composite part 312. Passive temperature control system 304 may be integrated and/or attached to tool 302 and/or caul plate 316, in these examples.

Passive temperature control system 304 may contain phase change material 318. Phase change material 318 may take a number of different forms. In these different advantageous embodiments, phase change material 318 may take the form of endothermic phase change material 320. In other words, phase change material 318 may absorb heat 321 when changing from a phase, such as from solid phase 322 to liquid phase 324. Phase change material 318 may be selected as a material having phase change temperature 332 that occurs around desired temperature level 330 for curing composite part 312.

In these examples, phase change material 318 may be selected from one of a metal, a metal alloy, a eutectic metal, a solder metal, and/or some other suitable material. Non-metal materials may be used, depending on the particular temperature.

Tool 302, with composite material 314 and possibly caul plate 316, may be cured using heat source 306. Heat source 306 may apply heat 326 to composite material 314. The application of heat 326 to composite material 314 may be applied in a manner that raises temperature 328 in composite material 314 to desired temperature level 330. Desired temperature level 330 may be a number of temperatures in which temperature 328 should remain to cure composite part 312. Desired temperature level 330 may be one or more temperatures in which temperature 328 should remain.

In these examples, desired temperature level 330, for curing composite material 314, may be around 350 degrees with a tolerance of plus or minus 10 degrees Fahrenheit. In some advantageous embodiments, desired temperature level 330 may be around 250 degrees with around plus or minus 10 degrees.

If temperature 328 is too low, composite material 314 may be under-cured. If temperature 328 is outside of desired temperature level 330, composite part 312 may not have the desired properties needed, and may be discarded.

Applying heat 326 from heat source 306 to cure composite material 314 may involve exothermic reaction 331 within composite material 314. Exothermic reaction 331 may be caused by various components within composite material 314. For example, without limitation, epoxy components in resins used in composite material 314 may have exothermic reaction 331 that may generate heat 321 and may cause temperature 328 to exceed desired temperature level 330.

In the different advantageous embodiments, phase change material 318 in passive temperature control system 304 may have phase change temperature 332 that may result in a phase change at a temperature that may be substantially at or below desired temperature level 330 for composite material 314. In other words, phase change material 318 may act as a limiter for temperature 328. Phase change material 318 may be capable of controlling heat 321 generated by exothermic reaction 331 by absorbing heat 321.

The temperature of phase change material 318 may not remain unchanged during melting of phase change material 318. Whether the temperature remains constant may depend on the selection of phase change material 318. For example, with a eutectic mixture of around 60 percent bismuth and around 40 percent tin for phase change material 318, the melting point may be constant at around 281 degrees Fahrenheit. A mixture of around 58 percent bismuth and around 42 tin may have a melting range from around 281 degrees Fahrenheit to around 338 degrees Fahrenheit.

As another illustrative example, phase change material 318 may be a mixture of around 8.0 percent bismuth and around 49.7 percent tin, around 41.8 percent lead, and around 0.5 percent silver. With this mixture, phase change material 318 may have a melting point of around 331 Fahrenheit degrees to around 342 degrees Fahrenheit.

For example, without limitation, phase change temperature 332 may be selected to be desired temperature level 330 for temperature 328. In other words, phase change material 318 may begin to melt from solid phase 322 to liquid phase 324 at the maximum desired level for temperature 328.

In other advantageous embodiments, phase change temperature 332 may be selected as a temperature below desired temperature level 330 to absorb heat 326 before exothermic reaction 331 generates additional heat. Phase change temperature 332 may be selected as any temperature that prevents temperature 328 from going over desired temperature level 330.

Further, passive temperature control system 304 may selectively place phase change material 318 near locations in which temperatures may exceed desired temperature level 330. For example, without limitation, thicker regions in composite material 314 may be regions around which phase change material 318 may be located within passive temperature control system 304 with respect to tool 302.

Manufacturing environment 300 may be applicable to manufacturing parts other than composite part 312. In some advantageous embodiments, part 311 may take the form of components being bonded to each other with adhesives. For example, without limitation, part 311 may comprise component 336 and component 338 with material 340 being located between component 336 and component 338. Component 338 may be placed on tool 302 with material 340 being placed on component 338.

Component 336 may be placed on material 340 on component 338. Material 340 may be a material that may be used to bond and/or secure component 336 to component 338. Material 340 may be, for example, an adhesive, a potting compound, a filler, or some other suitable material. Material 340 may be cured by heat source 306 to bond component 336 to component 338. Material 340 may be an adhesive in which exothermic reaction 342 may occur, in which heat 344 may be generated during the application of heat 326 to part 311.

In a similar fashion, passive temperature control system 304 may absorb heat 344 generated from exothermic reaction 342 of material 340. Material 340 may be, for example, without limitation, an epoxy adhesive. Component 336 and component 338 may be, for example, without limitation, already cured composite components, metal components, ceramic components, plastic components, and/or any other suitable components that may be bonded to each other using material 340.

In this manner, manufacture environment 300 also may be applied to manufacturing parts other than composite parts from curing composite materials. The different advantageous embodiments may be applied to any form of part 311 that may involve an exothermic reaction.

The illustration of manufacturing environment 300 is not meant to imply physical or architectural limitations to the manner in which different advantageous embodiments may be implemented. For example, without limitation, other components in addition to or in place of the ones illustrated may be employed. Further, some components illustrated for manufacturing environment 300 may be omitted. In some advantageous embodiments, caul plate 316 may be unnecessary for manufacturing part 311.

In yet other advantageous embodiments, multiple parts may be laid up on tool 302 at the same time. In still other advantageous embodiments, multiple tools may be present in which multiple parts may be laid up or manufactured on the different tools at the same time. Further, in yet other advantageous embodiments, robotic systems may be included in manufacturing environment 300 to automate one or more operations performed in manufacturing part 311.

With reference now to FIG. 4, a diagram illustrating a tool and a temperature control system is depicted in accordance with an advantageous embodiment. In this example, tool 400 and passive temperature control system 402 are shown in a cross-sectional side view and are an example of one implementation for tool 302 and passive temperature control system 304 in FIG. 3.

Tool 400 may have surface 404 and surface 406, which may be substantially parallel to each other. In this illustrative example, passive temperature control system 402 may be integrated into tool 400 as shown in side 408. Cavities 410 may be formed inside of tool 400, in this example. These cavities may be substantially parallel to surface 404 and/or surface 406 of tool 400.

Tool 400 may be made from a number of different types of materials. The particular material may be selected as one that may be capable of withstanding temperatures at which curing processes occur. In these illustrative examples, tool 400 may be comprised of, without limitation, a material selected from steel, aluminum, reinforced silicon rubber, nickel, carbon fiber composite, nickel-steel alloy, and/or some other suitable material.

Cavities 410 may be formed in surface 406 of tool 400 as grooves. Cavities 410 may be substantially parallel to surface 404 and surface 406. Cavities 410 are shown as circular channels in these examples. Cavities 410 may have other cross-sectional shapes such as, for example, without limitation, squares, rectangles, triangles, hexagons, and other suitable shapes.

In this example, phase change material 412 may be placed into cavities 410. Air gaps 414 may be present in cavities 410 after phase change material 412 may have been formed or placed into cavities 410. Air gaps 414 may take into account different amounts of thermal expansion that may occur between tool 400 and phase change material 412.

In these examples, cavities 410 may be distance 416 from surface 404 of tool 400 on which composite material 418 may be laid up for curing. Distance 416 may be selected such that phase change material 412 may be capable of absorbing heat generated by composite material 418 during a curing process.

Composite material 418 may include materials that may have exothermic reactions during the curing process. In these illustrative examples, composite material 418 may take the form of an uncured laminate. In these examples, cavities 410 with phase change material 412 may be located only around section 420 of tool 400, and not section 422. Cavities 410 may be selectively formed in a manner that passive temperature control system 402 may only need to be present in areas in which exothermic reactions may occur that could exceed desired temperatures.

Additionally, section 424 of composite material 418 is present. In this example, section 424 of composite material 418 may be thicker than section 426 of composite material 418. Section 424 may be located in section 420, while section 426 may be located in section 422. The thickness of section 426 of composite material 418 may be thin enough that exothermic reactions may not occur or may not be of concern for that particular portion of composite material 418.

With reference now to FIG. 5, a diagram illustrating a tool and a temperature control system is depicted in accordance with an advantageous embodiment. In this example, a cross-sectional side view of tool 500 and passive temperature control system 502 is depicted. Tool 500 and passive temperature control system 502 are an example implementation of tool 302 and passive temperature control system 304 in FIG. 3.

Tool 500 may have surface 504 and surface 506. Passive temperature control system 502 may be attached to surface 504, while composite material 508 may be laid up on surface 504. In this illustrative example, passive temperature control system 502 may include plate 510 and phase change material 512.

Grooves 514 may be formed on surface 516 of plate 510. Phase change material 512 may be placed into grooves 514 with air gaps 518 being present. Phase change material 512 and grooves 514 may be capable of absorbing heat that may be generated by composite material 508 during the curing process.

This heat may be generated by composite material 508 and conveyed through tool 500 to phase change material 512 in the direction of arrow 522. As can be seen in this illustrative example, passive temperature control system 502 may provide heat absorption around section 524 of composite material 508, while section 526 of composite material 508 may be controlled by passive temperature control system 502.

This configuration of passive temperature control system 502 may be such that passive temperature control system 502 may cover sections of composite material 508 in which exothermic reactions may generate temperatures that may rise above a selected threshold or desired temperature level. Section 526 of composite material 508 may have a thinner thickness as compared to section 524. Section 524 of composite material 508 may be more likely to have exothermic reactions than section 526.

Figure 6:
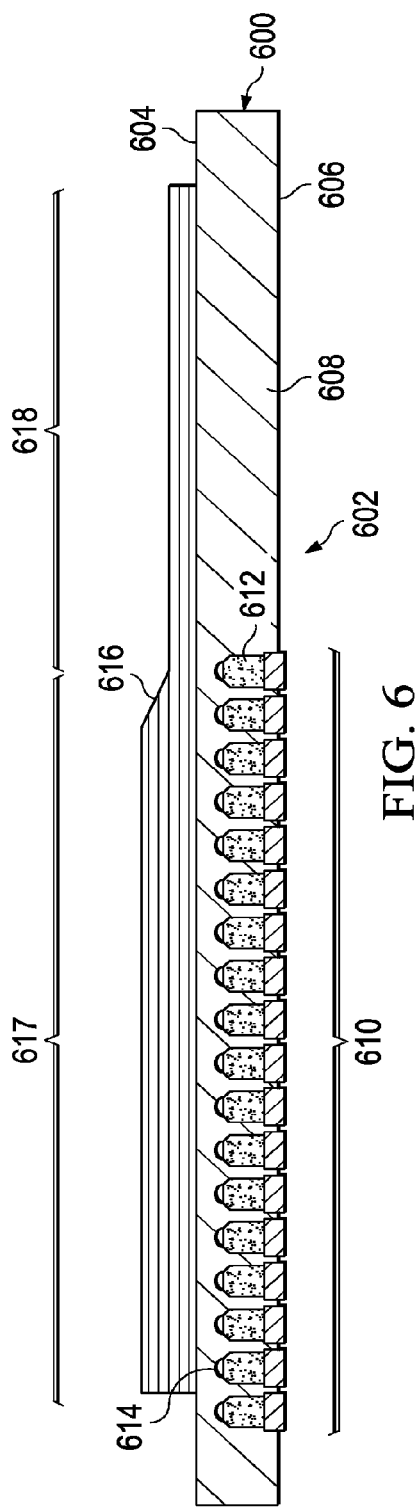
FIG. 6 is a diagram illustrating a tool with a passive temperature control system in accordance with an advantageous embodiment.

With reference now to FIG. 6, a diagram illustrating a tool with a passive temperature control system is depicted in accordance with an advantageous embodiment. Tool 600 and passive temperature control system 602 are depicted in this example. Tool 600 and passive temperature control system 602 are an example of one implementation for tool 302 and passive temperature control system 304 in FIG. 3. In this example, tool 600 may have surface 604 and surface 606. In this example, passive temperature control system 602 may be integrated into tool 600 as shown in inside 608. Holes 610 may be formed into surface 606 of tool 600. Holes 610 may be filled with phase change material 612. Air gaps 614 may be present in holes 610 after phase change material 612 has been placed into holes 610.

In this example, phase change material 612 may be capable of absorbing heat generated by composite material 616 during the curing process. As can be seen in this example, passive temperature control system 602 may be located only around section 617 of composite material 616 and not around section 618. Passive temperature control system 602 may be unnecessary for composite material 616 in section 618.

As can be seen in FIGS. 4-6, passive temperature control system 304 may be implemented in a number of different ways. In FIG. 4, passive temperature control system 402 may be integrated into tool 400 in cavities 410 formed within tool 400. In FIG. 5, passive temperature control system 502 may be attached to tool 500. In FIG. 6, passive temperature control system 602 may be integrated into tool 600 through holes formed into surface 606 of tool 600. Passive temperature control system 402 and passive temperature control system 602 may be implemented by creating and/or modifying tools 400 and/or 500. Passive temperature control system 502 may not require modifications to tool 500. Instead, passive temperature control system 502 may be attached to tool 500.

Figure 7:
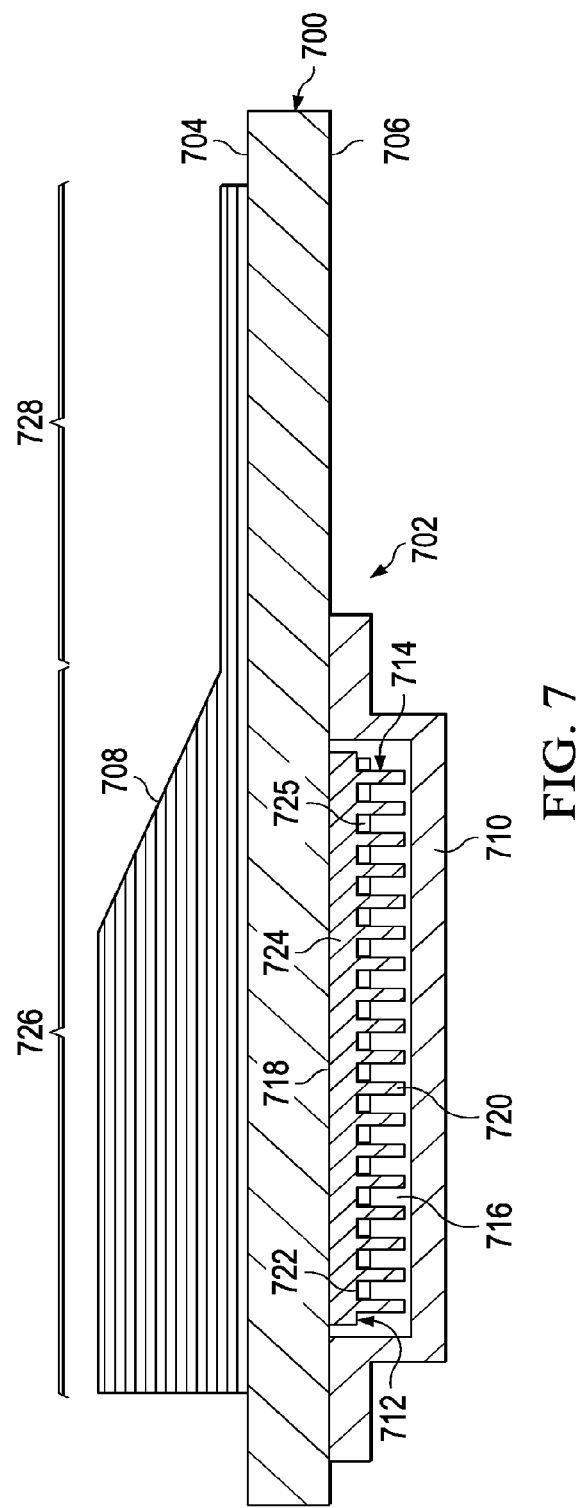
FIG. 7 is a diagram illustrating a tool and a passive temperature control system in accordance with an advantageous embodiment.

With reference now to FIG. 7, a diagram illustrating a tool and a passive temperature control system is depicted in accordance with an advantageous embodiment. In this illustrative example, tool 700 and passive temperature control system 702 are shown in a cross-sectional side view. Tool 700 and passive temperature control system 702 may be examples of one implementation for tool 302 and passive temperature control system 304 in FIG. 3.

Tool 700 may have surface 704 and surface 706. Composite material 708 may be laid up on surface 704, while passive temperature control system 702 may be attached and/or secured to surface 706. In this example, passive temperature control system 702 may include housing 710, heat sink 712, and phase change material 714.

Housing 710 may have cavity 716, in which phase change material 714 may be located. In this example, cavity 716 may have a rectangular cross-section. Of course, cavity 716 may have other cross-sectional shapes, depending on the particular implementation.

Heat sink 712 may have base 718 with fins 720 extending from surface 722 of base 718 into phase change material 714. Surface 724 of base 718 may be in contact with surface 706 of tool 700. Gap 725 may be present to take into account a difference in expansion between phase change material 714 and housing 710.

In these illustrative examples, heat sink 712 may be selected from a material that may be a high heat conductor. For example, without limitation, heat sink 712 may be constructed from a material selected from aluminum, copper, and/or some other suitable material.

As can be seen in this example, passive temperature control system 702 may be configured to absorb heat from section 726 of composite material 708. Heat absorption may not be provided for section 728 of composite material 708. Section 726 of composite material 708 may be thicker than section 728 of composite material 708. In these examples, exothermic reactions may not be of concern in section 728 as compared to section 726.

With reference now to FIG. 8, a diagram illustrating a tool and a passive temperature control system is depicted in accordance with an advantageous embodiment. In this example, tool 800 and passive temperature control system 802 are illustrated in a cross-sectional side view. Passive temperature control system 802 may be implemented as part of caul plate 804 in these illustrative examples.

Tool 800 may have composite material 806 laid up on surface 808 of tool 800. Surface 810 of caul plate 804 may be placed onto composite material 806. In this depicted example, phase change material 812 may be couple to caul plate 804. In other words, phase change material 812 may be located and/or embedded within layer 814 of caul plate 804. Layer 814 may be formed from a support material capable of holding and/or supporting phase change material 812.

In these illustrative examples, phase change material 812 may take the form of metal beads 818. Layer 814 may be formed from a material selected from at least one of an elastomeric material, a composite material, a plastic material, or some other suitable material. As used herein, the phrase "at least one of", when used with a list of items, means that different combinations of one or more of the items may be used, and only one of each item in the list may be needed. For example, "at least one of item A, item B, and item C" may include, for example, without limitation, item A, or item A and item B. This example also may include item A, item B, and item C, or item B and item C.

The material selected for layer 814 may be a material that may be capable of withstanding temperatures used in curing composite material 806. Layer 816 may be a hard layer and may be comprised of a material capable of providing a surface for use in curing composite material 806. As a hard layer, layer 816 may be capable of forming a smooth surface and/or textured surface for surface 808 on composite material 806 when curing composite material 806.

Although metal beads are shown in this example, composite material 806 may be implemented in other forms. For example, without limitation, phase change material 812 may take the form of rods, wire, mesh, and/or some other suitable form that may be formed within layer 814. In some advantageous embodiments, layer 814 may be made from the same material as layer 816.

With reference now to FIG. 9, a diagram illustrating a tool and a passive temperature control system is depicted in accordance with an advantageous embodiment. In this example, tool 900, passive temperature control system 902, and caul plate 904 are illustrated in a cross-sectional side view and are examples of one implementation for tool 302, passive temperature control system 304, and caul plate 316 in FIG. 3.

Composite material 906 may be laid up on surface 908 of tool 900. Surface 910 of caul plate 904 may be placed onto composite material 906 in these examples.

In this illustrative example, passive temperature control system 902 may be integrated as part of caul plate 904. Passive temperature control system 902 includes phase change material 912 in layer 914. In this illustrative example, phase change material 912 may be located within, encompassed by, and/or embedded in layer 914. Layer 914 may be a support layer that may be capable of withstanding temperatures that may be encountered during curing of composite material 906. Layer 916 may be a hard portion of caul plate 904. This portion of caul plate 904 may be capable of being used in forming composite material 906. Phase change material 912, in these examples, takes the form of metal plate 918 within layer 914.

The illustration of the passive temperature control systems in FIGS. 4-9 are not meant to imply physical or architectural limitations to the manner in which a passive temperature control system may be implemented for a curing process. Other components in addition to, or in place of, the ones illustrated may be used depending on the particular implementation.

Other components also may be unnecessary, and other configurations of the existing components may be employed. For example, in some advantageous embodiments, the passive temperature control system may be implemented in both the tool and in the caul plate. In yet other advantageous embodiments, the passive temperature control system may extend the entire length of the composite material rather than only a portion of the composite material on the tool.

Figure 10:
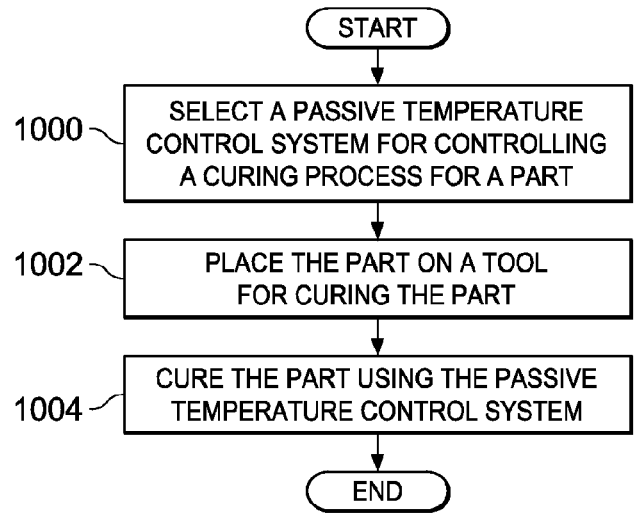
FIG. 10 is a flowchart of a process for curing a part in accordance with an advantageous embodiment.

With reference now to FIG. 10, a flowchart of a process for curing a part is depicted in accordance with an advantageous embodiment. The process illustrated in FIG. 10 may be implemented in a manufacturing environment, such as manufacturing environment 300 in FIG. 3.

The process begins by selecting passive temperature control system 304 for controlling a curing process for part 311 (operation 1000). Operation 1000 may involve selecting a particular tool, or may involve manufacturing a tool containing the appropriate phase change material needed to control exothermic reactions for part 311.

The process may place part 311 on tool 302 for curing part 311 (operation 1002). The process may cure part 311 using passive temperature control system 304 (operation 1004), with the process terminating thereafter. Passive temperature control system 304 may have phase change material 318 selected as having phase change temperature 332 around desired temperature level 330 for curing part 311. Phase change material 318 may have a phase change temperature that may be capable of controlling heat generated by the part during curing of the part. Phase change temperature 332 may be around a desired temperature level for curing part 311 and may be a temperature that is less than the temperature for curing part 311.

Figure 11:
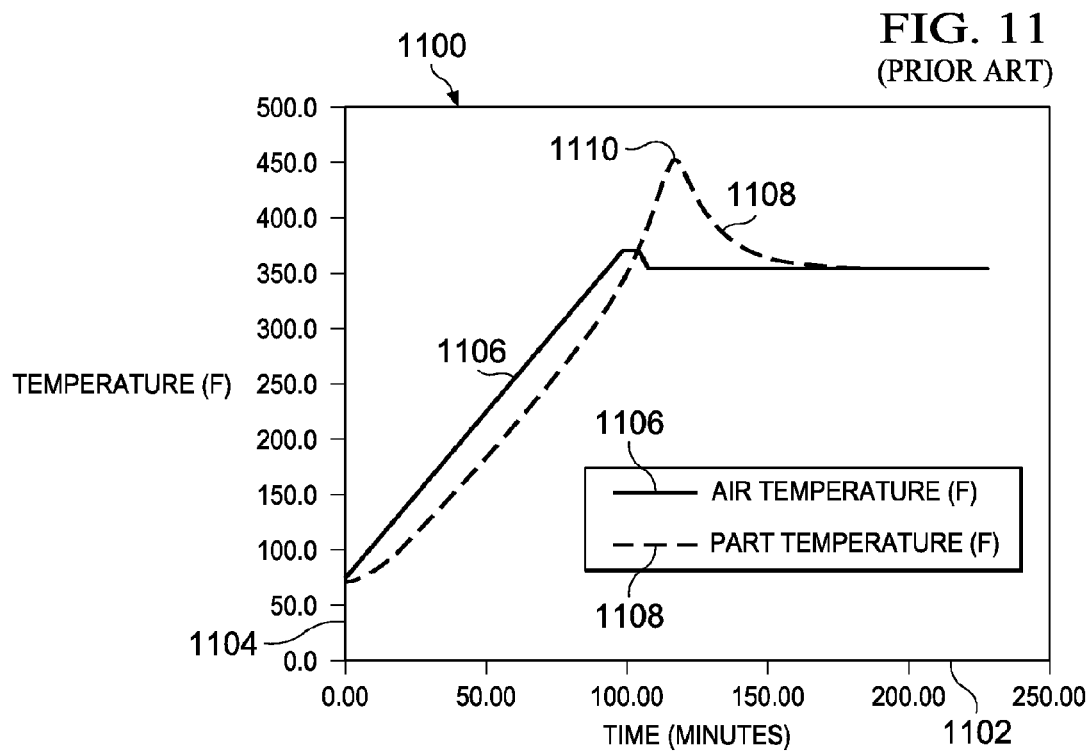
FIG. 11 is a diagram of an out-of-control curing process.

With reference now to FIG. 11, a diagram of an out-of-control curing process is depicted. In this example, diagram 1100 illustrates simulated temperatures for a curing process. In this example, X-axis 1102 represents time, while Y-axis 1104 represents temperature. Line 1106 may be the temperature of the air, while line 1108 may be the temperature of the part being cured.

In this example, diagram 1100 may illustrate curing of a two-inch thick laminate using a three Fahrenheit per minute heating rate with a cure temperature of around 355 degrees. As can be seen, line 1108 exceeds the target temperature by around 95 degrees as seen at point 1110 in line 1108. This type of temperature increase from an exothermic reaction may cause the part to be rejected.

Figure 12:
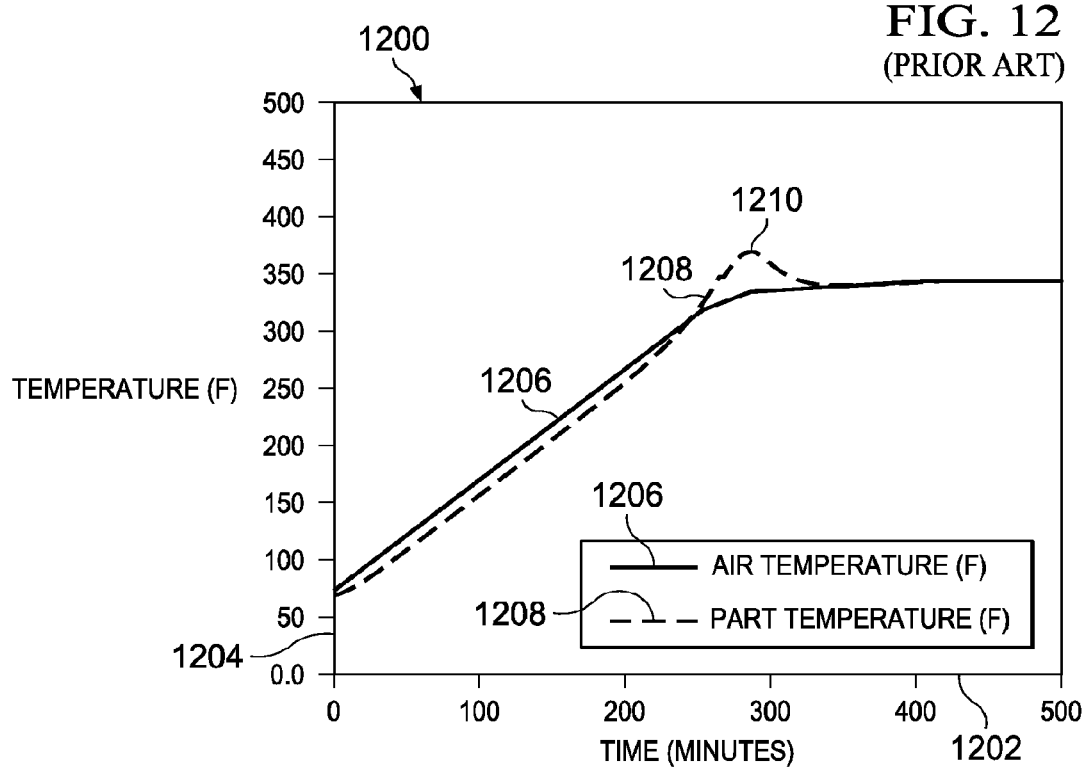
FIG. 12 is a diagram of a conventional approach for curing a part.

With reference now to FIG. 12, a diagram of a conventional approach for curing a part is depicted. In this example, a simulation of a two-inch thick laminate similar to the one cured in diagram 1100 in FIG. 11 is illustrated in diagram 1200. In this example, diagram 1200 depicts time on X-axis 1202 and temperature on Y-axis 1204.

The heating rate, in this example, may be slowed stepwise from one degree Fahrenheit per minute, to 0.5 degrees Fahrenheit per minute, and then to 0.1 degrees Fahrenheit per minute. In this example, line 1206 may represent air temperature, while line 1208 may represent the temperature of the part. In this example, line 1208 may illustrate a maximum temperature of around 380 degrees at point 1210, which may be around 25 degrees above the maximum temperature. Further, this process also may increase the processing time by three hours.

Figure 13:
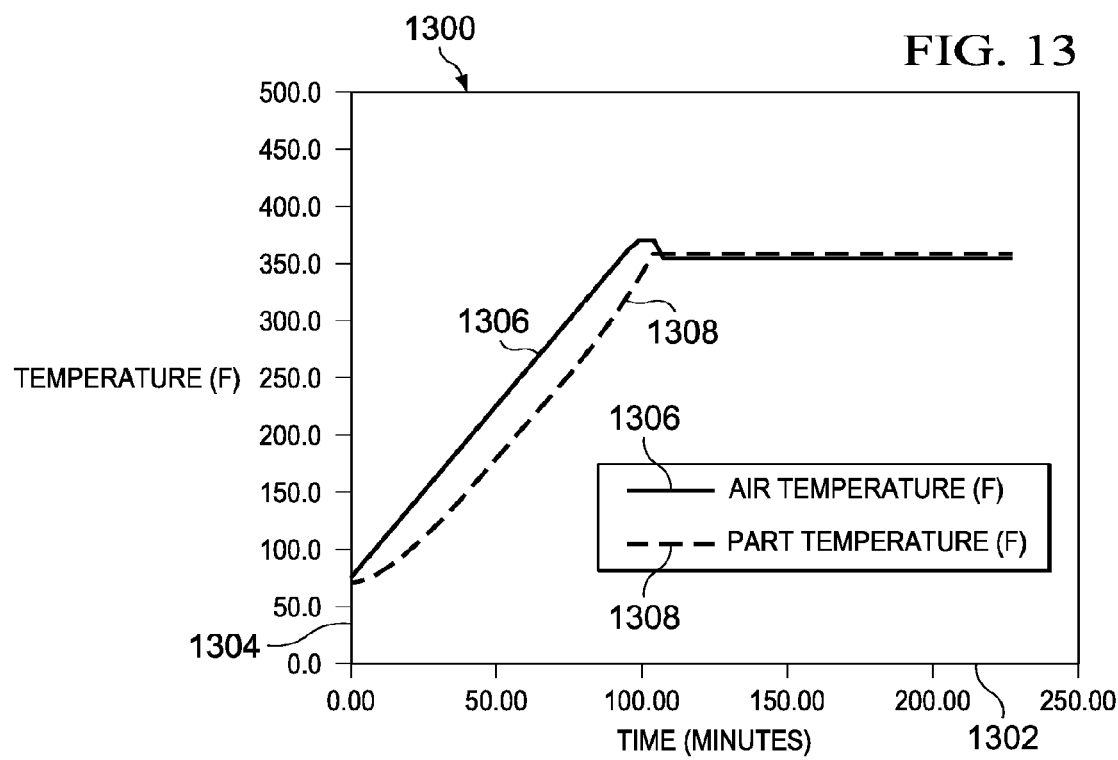
FIG. 13 is a diagram illustrating a curing process using a passive temperature control system in accordance with an advantageous embodiment.

With reference now to FIG. 13, a diagram illustrating a curing process using a passive temperature control system is depicted in accordance with an advantageous embodiment. In this example, diagram 1300 represents a simulation of curing the same two-inch thick laminate as described for FIGS. 11 and 12. In diagram 1300, X-axis 1302 may represent time, while Y-axis 1304 may represent temperature. Line 1306 may represent the air temperature, and line 1308 may represent the part temperature.

As can be seen in this example, the temperature in line 1308 may not exceed the cure temperature of around 355 degrees Fahrenheit. In this illustrative example, a phase change material that may be around 0.5 inches thick with a melting point of around 358 degrees Fahrenheit is employed. As a result, increased temperatures from an exothermic reaction may be avoided.

Thus, the different advantageous embodiments provide a method and apparatus for curing parts. The different advantageous embodiments provide a capability to maintain the temperature of a part within a desired temperature level during the curing process. The different advantageous embodiments may employ a passive temperature control system that may be passive using a phase change material. The change in the phase of the phase change material such as, for example, without limitation, from a solid to a liquid, may absorb heat in a manner that reduces and/or eliminates the effects of exothermic reactions that may occur within the composite material during the curing process.

As discussed above, the passive temperature control system may be deployed in a number of different ways and locations to provide a tailored passive temperature control system for particular types of parts based on the complexity, thickness, and other parameters of the parts. Further, the different advantageous embodiments allow for simplified tooling designs, retrofitting of current tools, and other suitable modifications to tools.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments have been described with respect to aircraft, other advantageous embodiments may be applied to other types of objects.

For example, without limitation, other advantageous embodiments may be applied to composite repair processes, such as a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for curing a part, the method comprising:
providing a tool, the tool comprising:
a material having a first surface substantially parallel to a second surface;
a plurality of cavities completely inside the material and substantially parallel to the first surface and to the second surface; and
a phase change material disposed within the plurality of cavities, the phase change material having a phase change temperature that is about a cure temperature for a composite laminate part, the phase change material further selected so that a change of phase of the phase change material absorbs heat during the change of phase at the phase change temperature,
placing the composite laminate part on the first surface of the material;
curing the composite laminate part, thereby generating heat; and
transferring the generated heat, during said curing, from the composite laminate part to the phase change material by inducing the change of phase in the phase change material in the plurality of cavities so as to maintain a third temperature of the part within a desired temperature range near the cure temperature,
wherein the tool includes a first section in which the plurality of cavities are located and a second section in which there are none of the plurality of cavities, wherein the composite laminate part includes a thicker portion relative to a thinner portion of the composite laminate part, and wherein said placing the composite laminate part comprises placing the thicker portion of the composite laminate part over the first section and placing the thinner portion over the second section.

2. The method of claim 1, wherein the plurality of cavities is located a distance from the first surface of the material on which the composite laminate part is placed, and wherein the method further comprises:
selecting the distance to allow the phase change material to absorb the heat from the part.

3. The method of claim 1, wherein said placing further comprises:
laying up the composite laminate part on the tool.

4. The method of claim 1, wherein the cure temperature comprises about 250 degrees Fahrenheit plus or minus 10 degrees Fahrenheit.

5. The method of claim 1, wherein said placing includes placing the composite laminate part such that selected areas of the composite laminate part are in closer proximity to the phase change material than other areas of the composite laminate part.

6. The method of claim 1, wherein providing the tool includes providing the tool such that the cavities have a shape selected from the group consisting of: squares, rectangles, triangles, and hexagons.

7. The method of claim 1, wherein providing the tool includes providing air gaps within the plurality of cavities along with the phase change material.

8. The method of claim 7, wherein the air gaps have a size that takes into account different amounts of thermal expansion that occurs between the tool and the phase change material.

9. The method of claim 1, wherein providing the tool includes selecting the material from the group consisting of: steel, aluminum, reinforced silicon rubber, nickel, carbon fiber composite, and nickel-steel alloy.

10. The method of claim 1 further comprising:
   generating exothermic reactions in the composite laminate part during said curing.

* * * * *